United States Patent [19]

Liao

[11] Patent Number: 5,955,401
[45] Date of Patent: Sep. 21, 1999

[54] CLAY-FREE BIODEGRADABLE WELLBORE FLUID AND METHOD FOR USING SAME FLUID

[75] Inventor: W. Andrew Liao, Kingwood, Tex.

[73] Assignee: Baroid Technology, Inc., Houston, Tex.

[21] Appl. No.: 08/649,097

[22] Filed: May 17, 1996

[51] Int. Cl.$^6$ ................................................... C09K 7/02
[52] U.S. Cl. ............................ 507/110; 507/111; 507/112
[58] Field of Search .................................. 507/110, 111, 507/212, 213, 112, 211; 175/65

[56] References Cited

U.S. PATENT DOCUMENTS

| | | | |
|---|---|---|---|
| 3,988,246 | 10/1976 | Hartfiel | 252/8.5 A |
| 4,025,443 | 5/1977 | Jackson . | |
| 4,151,096 | 4/1979 | Jackson . | |
| 4,240,915 | 12/1980 | Block . | |
| 4,255,268 | 3/1981 | Block . | |
| 4,264,455 | 4/1981 | Block . | |
| 4,366,070 | 12/1982 | Block . | |
| 4,422,947 | 12/1983 | Dorsey et al. | 252/8.5 C |
| 4,428,845 | 1/1984 | Block . | |
| 4,473,479 | 9/1984 | Block . | |
| 4,559,233 | 12/1985 | Chen et al. | 426/104 |
| 4,619,772 | 10/1986 | Black et al. | 252/8.514 |
| 5,407,909 | 4/1995 | Goodhue et al. | 507/118 |
| 5,552,462 | 9/1996 | Yeh | 524/55 |
| 5,591,699 | 1/1997 | Hodge | 507/110 |

OTHER PUBLICATIONS

Seheult, M. et al., "Biopolymer Fluids Eliminate Horizontal Well Problems", World Oil, Jan. 1990.
Byrd, B. et al., "Fluids Are Key In Drilling Highly Deviated Wells", Petroleum Engineer International, Feb., 1988.
Wilson, D.B., "Something New In Environmental Horizontal Installation", WWJ, Feb., 1996.
"Bio–Bore", Baroid Industrial Drilling Products, Sep., 1995.
Oakley, D.B., "Environmental Horizontal Well Installation and Performance: Lessons Learned", Horizontal News, published by DOE Environmental Management, Office of Technology Development, vol. 1 No. 2, Fall 1995.

*Primary Examiner*—Philip Tucker
*Attorney, Agent, or Firm*—Craig W. Roddy; Karen B. Tripp

[57] ABSTRACT

A dry mix additive, which is used to form a clay-free, i.e., non-argillaceous, inorganic salt-free, i.e., non-brine, biodegradable and chemically degradable aqueous-based wellbore fluid, which is capable of imparting non-Newtonian, pseudoplasticity and fluid loss controlling properties to aqueous systems for use in horizontal directional drilling, finding utility in horizontal environmental well installation for soil and groundwater remediation. The dry mixture comprises (1) from about 80–90 by weight of pre-gelatinized corn starch heteropolysaccharide, and (2) from about 10–20 by weight of a synthetic biopolymer such as Xanthan gum treated with a dispersing agent (glyoxal) for ease of dispersion. Sodium hypochlorite can be added, if desired, to the wellbore fluid to provide resistance to bacterial attack. The dry mixture is added to either fresh water or acidic water in amounts of 12–15 pounds of the dry mixture to a barrel (42 U.S. gallons) of water and then used as a drilling fluid in drilling horizontal wells for soil and groundwater remediation. Also, if desired, calcium hypochlorite can be circulated through the borehole following the drilling operation to accelerate the degradation of the polymers in the wellbore fluid. Following the drilling of the borehole, the contaminated formation fluids are withdrawn from the borehole.

4 Claims, No Drawings

CLAY-FREE BIODEGRADABLE WELLBORE FLUID AND METHOD FOR USING SAME FLUID

BACKGROUND OF THE INVENTION

The present invention relates to a composition which is capable of imparting non-Newtonian, pseudoplasticity and fluid loss controlling properties to aqueous systems. More particularly, the present invention relates to the formation of a water-based, clay-free, inorganic salt-free and biodegradable drilling fluid for use in drilling horizontal wells for soil and groundwater remediation.

One of the most common methods for subsurface environmental remediation, such as the removal of contaminants from contaminated soil and ground water, is first to bore a wellbore either vertically or horizontally towards the contaminated zone or plume, and then to install an extraction well to extract contaminants using air or fluid to withdraw contaminated ground water. The vertical delivery and recovery systems are by far the most conventional approaches to soil and groundwater remediation. Recent advances in horizontal directional drilling have added a new dimension to the environmental remediation. It is advantageous to drill horizontal wells instead of vertical wells for several reasons. Conventionally drilled vertical wells are perpendicular to the central axis of the contaminated zone, while horizontal wells can travel parallel to such central axis. One horizontal well can treat areas that previously required as many as ten or more vertical wells. The geometry of a horizontal well provides a large well screen area for recovery, thereby improving the efficiency of the remediation process. Moreover, horizontal wells can access areas otherwise inaccessible by vertical wells, such as contaminant sources located underneath buildings, landfills, ponds, and contaminant plumes that have migrated offsite. They thus provide a cost-effective and less destructive method for soil and groundwater remediation.

The purpose of a well drilling method typically is to construct a wellbore that can receive a well casing while causing minimum damage to the formation hosting the well screen. The damage is commonly referred to as skin damage and can be caused by both physical and chemical changes to the host formation. The physical changes generally involve a compacting of the pore spaces and the intrusion of foreign particles into the formation pore spaces. Chemical changes are dissolution and precipitation of minerals caused by any chemical interaction between the formation fluids and the drilling fluid. Skin damage is not strictly limited to the side of the wellbore. The damage continues into the formation as far as the drilling fluid can travel, generally referred to as "invasion". The extent of drilling fluid invasion to the host formation can cause difficulty during well development. Using fluid to aid in drilling often referred to as fluid assisted drilling is the most common and conventional method of horizontal directional drilling (HDD). The principal functions of drilling fluid in HDD include transportation of the drilled soil or rock cuttings to the surface, cooling and cleaning of the drill bit or reamer cutters, reduction of friction between the drill pipe and the wellbore, and borehole stabilization, particularly in soft soil formation, transmission of hydraulic excavation, and soil modification. In addition to performing the functions mentioned above, drilling fluid used in an HDD installation should be environmentally benign and easily processed. A drilling fluid that can be degraded biologically, often referred to as biodegradable, is the most desirable fluid for use in environmental directional well installation.

Generally, drilling fluids will be either clay-based, such as Wyoming bentonite, or clay-free such as brines and polymer slurries. While water is a clay-free fluid, water alone does not have the capacity to carry the drilled cuttings from the borehole to the surface. In the drilling fluid class, clay-based fluids have for years been dominant in the field, because of the traditional and widely held theory that the viscosity suitable for creating a particle carrying capacity in the drilling fluid could be achieved only with a drilling fluid having thixotropic properties, that is, the viscosity must be supplied by a material that will have sufficient gel strength to prevent the drilled particles from separating from the drilling fluid when agitation of the drilling fluid has ceased. In order to obtain the desirable thixotropy or gel strength, hydratable clay or colloidal clay bodies such as sodium-based bentonite have been employed. As a result, the drilling fluids are usually referred to as drilling "muds". The use of drilling muds has provided the means of meeting two basic requirements of drilling fluids, i.e., viscosity for hole cleaning and gel strength for cuttings transportation. However, the clay-based drilling muds form a mud filter cake on the borehole wall which is difficult to remove during well development. Furthermore, the clay particles in the clay-based drilling muds may enter the host formation before a mud cake is formed and formation permeability and porosity may be reduced. When the permeability of a host formation is reduced, the efficiency for withdrawing contaminants from a contaminated soil or groundwater decreases. Yet another serious disadvantage of clay-based drilling muds is that they are not biodegradable and require transportation to a designated area for disposal, thus increasing the cost of the drilling operation.

A non-argillaceous (clay-free) drilling fluid, such as fresh water, avoids many of the clay-based fluid problems, but may cause hydration and disintegration of the host formation. However, fresh water with proper additives may provide a drilling fluid with those basic requirements of drilling fluids. When a clay-free drilling fluid requires relatively high viscosity and gel strength, for example, when used in horizontal directional drilling, it is generally necessary to employ an additive, which may be comprised of a single compound or an admixture of several compounds to thicken the fluid to the point where it will have the necessary carrying capacity and the adequate hole cleaning capability. It is a widely held and accepted theory that a clay-free drilling fluid should exhibit pseudoplastic properties, that is the viscosity must be sufficient to prevent the drilled particles from separating from the drilling fluid when the fluid is under the influence of low shear forces such as those encountered in the annular passage. Materials that can be added to water to create a water-based fluid with pseudoplastic properties are described in the prior art, discussed hereinafter.

Another requirement of a drilling fluid for boring a hole, either vertically or directionally, is a low fluid loss or filtration rate as commonly referred to in the oil and gas well drilling art. It is not enough that a drilling fluid has adequate viscosity and gel strength to prevent the drilled cuttings from settling when circulation of the fluid is stopped. If the drilling fluid does not have a low filter loss, it may result in loss of the drilling fluid to the host formation, particularly when drilled through an unconsolidated formation such as sandy soil. In the article entitled "Fluids Are Key in Drilling Highly Deviated Wells," published in Petroleum Engineer International, Feb. 1988 (pp. 24–26), B. Byrd and M. Zamora described the importance of filtration control to minimize formation damage in drilling highly deviated wells. A drilling fluid with a low filtration rate allows only a small amount of water to diffuse from the drilling fluid to the formation surrounding the wellbore under the pressure differential prevailing in the borehole.

U.S. Pat. No. 4,240,915 to Block discloses a water-based, clay-free drilling fluid suitable for circulating in a borehole while drilling the borehole into a subterranean formation, such fluid including water, a water loss inhibitor, a weighing agent and a viscosifying agent, in which the viscosifying agent is an aqueous medium produced by mixing under a high degree of agitation a water soluble alkali metal aluminate ($Na_2O \bullet Al_2O_3 \bullet 3H_2O$) with a water soluble acidic compound selected from the group consisting of an inorganic acid or a salt of a strong acid and a weak base. The aqueous part of the drilling fluid has the aluminum hydroxide agent in an amount sufficient to impart non-Newtonian, pseudoplastic properties to the fluids when the fluids have a pH of at least 8.

U.S. Pat. No. 4,255,268 to Block discloses a water-based, clay-free drilling fluid for use in drilling boreholes into subterranean formations having an aqueous mixture of water, a water-loss inhibitor, a weighting agent and a viscosifying agent, in which the viscosifying agent is a ferric hydroxide reaction product formed in an aqueous media by contacting under a high degree of agitation a water soluble ferric salt such as ferric chloride ($FeCl_3$) with a water soluble base which contains or produces hydroxide groups in water in amounts to cause the hydroxy to ferric ratio to be at least about 3:1, for example $Fe(OH)_3$. The aqueous phase of the drilling fluid has the ferric hydroxide [Fe(OH),] agent therein in an amount sufficient to impart non-Newtonian, pseudoplastic properties to the fluid at a pH of at least 8.

U.S. Pat. No. 4,264,455 to Block is directed to an aqueous, clay-free drilling fluid for use in drilling boreholes into subterranean formations having an aqueous system comprising water, a water-loss inhibitor, and a viscosifying agent, in which the viscosifying agent is a hydroxyl containing magnesium containing reaction product. The hydroxyl containing magnesium agent of the reaction product is formed in an aqueous medium under high speed agitation between a magnesium salt, such as MgO, which is substantially soluble in water and a water soluble base selected from the group consisting of alkali metal oxide, alkali metal hydroxide, alkali metal salt of a weak acid and ammonium hydroxide. The aqueous system of the drilling fluid has the subject reaction product therein in an amount sufficient to impart non-Newtonian, pseudoplastic properties to the fluids when the fluids have a pH above 11.

U.S. Pat. No. 4,366,070 to Block describes an improved water-based, clay-free drilling fluid that is capable of imparting a high degree of pseudoplastic and fluid loss controlling properties. The composition is a combination of a hydroxy containing aluminum agent having an assumed molecular formula of AlO(OH) and a cross-linked hydroxyalkyl cellulose reaction product. The composition involves (1) a hydroxy containing aluminum agent formed by mixing in an aqueous solution and under high degree of agitation a water soluble basic agent selected from an alkali metal aluminate, alkali metal hydroxide or ammonium hydroxide with a water soluble acidic agent selected from an inorganic acid, or aluminum chloride, sulfate or nitrate such that at least one of such agents is an aluminum containing compound; (2) a reaction product formed between a hydroxyalkyl cellulose and a cross-linking agent, the cross-linking agent being present at a concentration equivalent to at least about 1% of stoichiometry with respect to the hydroxyalkyl cellulose.

U.S. Pat. No. 4,428,845 to Block is directed to a composition for imparting both pseudoplasticity and water loss control to alkaline aqueous systems and to the use of such compositions to form an improved water-based, clay-free drilling fluid. The composition is a combination of (1) a hydroxy containing aluminum agent similar to that described in the U.S. Pat. No. 4,366,070; and (2) a reaction product formed in an acidic medium between a polyvinyl alcohol with 0.01 to 0.1% of stoichiometry of a polyaldehyde. Both polyvinyl alcohol and polyaldehyde are synthetic (man-made) polymers, as opposed to naturally occurring polymers.

U.S. Pat. No. 4,473,479 to Block describes a composition that is capable of imparting a high degree of pseudoplastic and water loss controlling properties to aqueous systems and to the use of such compositions to form an improved water-based, clay-free drilling fluid. The subject composition is a combination of a hydroxy containing aluminum agent similar to the one described in the U.S. Pat. Nos. 4,428,845 and 4,366,070, and a reaction product formed between a hydroxyalkyl and a cross-linking agent. The cross-linked hydroxyalkyl cellulose reaction product is similar to the one described in the U.S. Pat. No. 4,366,070.

U.S. Pat. No. 3,988,246 to Hartfiel is directed to an improved clay-free wellbore fluid having thixotropic gel properties for use in subterranean formations, in which the fluid includes water, a viscosifying amount of a heteropolysaccharide produced by the action of bacteria of the genus Xanthomonas on carbohydrates, a stabilizing amount of magnesium oxide (MgO), an organic starch derivative and a brine forming soluble salt. In some situations a salt of lignosulfonate is added to maintain the desirable properties of wellbore fluid.

U.S. Pat. Nos. 4,025,443 and 4,151,096 to Jackson each describes an additive composition for use in clay-free, non-argillaceous, wellbore fluids including a hydroxyalkyl guar gum and a stabilizing amount of magnesia and a highly infusible magnesium oxide (MgO), or magnesium hydroxide [$Mg(OH)_2$]. One theory of the effectiveness of these two patents is that the very slightly soluble magnesia which is present in excess of its solubility in the wellbore fluid provides a reservoir of basicity of just the correct amount to maintain the Ph of the fluid in the range at which the guar gum is most stable. Without the addition of magnesia or magnesium hydroxide, guar gum, which is well known to be unstable or degradable in neutral pH environment, deteriorates rapidly.

U.S. Pat. No. 4,422,947 to Dorsey et al is directed to a clay-based or clay-free aqueous thixotropic wellbore fluid having improved fluid loss control, desirable flow characteristics and low shale sensitivity for use in drilling a well. The fluid includes water or a brine base including an effective amount of an additive including (1) a cross-linked potato starch, heteropolysaccharide cross-linked with a cross-ling compound selected from either phosphorous oxychloride or urea-formaldehyde, (2) a heteropolysaccharide derived from a carbohydrate by bacteria of the genus Xanthomonas, and (3) a hydroxyethylcellulose. Such a wellbore fluid is either clay-based, or a clay-free but is a brine-based solution containing water soluble salts such as sodium chloride (NaCl), calcium chloride (CaCl) or potassium chloride (KC1). This patent is also directed to a liquid concentrate water loss control additive for use in water-based or brine-based wellbore fluids with the same composition as that in the dry mix additive described previously. However, the liquid concentrate additive according to this patent contemplates the carrier being either an alcohol or diesel oil.

U.S. Pat. No. 5,407,909 to Goodhue, Jr. et. al is directed to a method for preparing and using an earth stabilization fluid comprising (1) adding water into an earth cavity, (2) adding dry powder PHPA into the cavity; and (3) excavating to enlarge the cavity while a portion of the dry powder PHPA is in a transitory, partially hydrated swollen state.

In summary, the patents of Block, as described above, involve a water-based, clay-free drilling fluid for use in drilling boreholes into subterranean formations having an aqueous mixture consisting of water, a water loss inhibition and a viscosifying agent. The viscosifying agent disclosed in each such patent to Block involves an inorganic compound, for example, aluminum hydroxide in U.S. Pat. No. 4,240, 915, ferric hydroxide in U.S. Pat. No. 4,255,268, magnesium hydroxide in U.S. Pat. No. 4,264,455, and hydroxy containing aluminum in each of U.S. Pat. Nos. 4,366,070; 4,428, 845; and 4,473,479. Those inorganic viscosifying agents are not biodegradable and some of them are not completely soluble in water. The insoluble particles or fines in the clay-free but not solid-free water-based drilling fluid can block or restrict flow through the host formations, thus reducing the efficiency of environmental remediation involving the withdrawal of the contaminated groundwater from subterranean formations. The water-based, clay-free drilling fluids described in such patents to Block simply are not environmentally acceptable for use in environmental horizontal well installation for soil and groundwater remediation.

Also in summary, the patents of Hartfiel and Jackson, described above, involve viscosifying agents derived from heteropolysaccharides, for example, a heteropolysaccharide produced from carbohydrates with Xanthomonas bacteria in U.S. Pat. No. 3,988,246 (to Hartfiel), hydroxyalkyl guar gum in U.S. Pat. Nos. 4,025,443 and 4,151,096 (both to Jackson); however, none of those viscosifying agents are stable without the addition of a magnesium containing inorganic compound. The clay-free wellbore fluids of Hartfiel and Jackson are likewise not suitable for environmental horizontal well installation applications.

A heteropolysaccharide cross-linked with phosphorous oxychloride and urea-formaldehyde is employed as the viscosifying agent in the above-noted patent to Dorsey et. al. Urea-formaldehyde and its derivatives are known to be environmentally unfriendly substances. Furthermore, the dry additive in this patent was intended to be used in a brine-based completion fluid for oil/gas well drilling and completion works, in which the liquid concentrate is dispersed or suspended in alcohol or diesel oil, neither of which is suitable for use in environmental horizontal directional drilling such as environmental well installation.

A high molecular weight, synthetic copolymer of polyacrylamide and polyacrylate when mixed with fresh water provides a viscous polymer solution for use in geoconstruction drilling such as drilled shaft and trenching. This type of clay-free, borehole stabilizing fluid described in the prior art to Goodhue Jr. et. al does not exhibit those prerequisite properties of a drilling fluid such as pseudoplasticity and gel strength for cuttings suspension and low fluid loss control capability. The fluid mentioned in this patent provides only fluid viscosity and cohesion to keep the drilled borehole from sloughing. Without any exception, the patent to Goodhue et al is only applicable to bore vertical holes with a limited depth of perhaps 250 feet. The fluid described in U.S. Pat. No. 5,407,909 simply is not suitable for boring a far reached directional particularly horizontal borehole. Moreover, the copolymer of polyacrylamide and polyacrylate is not considered to be a biodegradable polymer. The copolymer, which forms a hydrated, deformed mass in water, adsorbs tightly on the surface of the formation and coats or encapsulates the formation particles. The encapsulation may cause disruption of flow of the host formation. As the result, such a fluid is not suitable for use in environmental horizontal well installation for soil and groundwater remediation.

It is therefore the primary object of the present invention to provide an aqueous, clay-free and inorganic salt-free, pseudoplastic, stable drilling fluid which does not damage the formations hosting the borehole.

It is also an object of the present invention to form an aqueous, clay-free, inorganic salt-free, and biodegradable fluid which exhibits non-Newtonian, pseudoplastic properties so as to be capable of drilling boreholes, particularly directional or horizontal boreholes, and the like in an efficient manner.

Further, it is the object of the present invention to form a drilling fluid which is substantially stable to varying environmental conditions of low pH normally encountered in borehole drilling.

Yet, it is another object of the present invention to form a drilling fluid which is biodegradable, which does not damage the host formations surrounding the drilled borehole, which does not block the passage or flow path of the formations.

Still, it is the object of the present invention to form a drilling fluid which exhibits low fluid loss and high gel strength properties so as to be capable of drilling boreholes in an unconsolidated formation.

It is also an object of the present invention to provide a drilling fluid additive consisting of a dry mixture of a naturally occurring polymer and a biopolymer. When such dry mixture additive is mixed with an aqueous continuous phase including fresh water and/or acidic water with a low pH, it provides a homogeneous drilling fluid having sufficient, stable viscosity for hole cleaning, adequate gel strength, particularly initial gel strength for cuttings or spoils suspension, and low water loss control, a most desirable fluid property when drilling in an unconsolidated formations such as sandy soil.

It is an additional advantage of the present invention that the drilling fluid formulated with the dry concentrate comprising an admixture of polymers is non-toxic, and biodegradable.

It is a further advantage of the present invention that this water-based, clay-free, biodegradable, pseudoplastic drilling fluid is most suitable for drilling environmental horizontal wells for remediation works.

These and other advantages and features of the present invention will become apparent from a reading as the following disclosure, description and teachings set out below.

SUMMARY OF THE INVENTION

The objects of the invention are accomplished, generally, by the provision of a clay-free, inorganic salt-free, wellbore fluid comprising either fresh water or an acidic water, or mixtures thereof, into which there is mixed a dry mixture comprising from about 80–90 percent by weight of a natural polymer and from about 10–20 percent by weight of a synthetic biopolymer.

More specifically, the preferred embodiment of the present invention contemplates the natural polymer comprising a corn starch polymer or a potato starch polymer, or mixtures thereof, and the synthetic biopolymer comprising Xanthan gum treated with a dispersing agent, for example, glyoxal.

As an additional feature of the present invention, the drilling fluid can be preserved with a commercially available sodium hypochlorite solution commonly referred to as bleach.

As yet another feature of the present invention, the drilling fluid can be chemically destroyed with calcium hypochlorite having at least 65% available chlorine.

These and other objects, features and advantages of the present invention will become apparent from the following description and the appended claims.

DESCRIPTION OF THE PREFERRED EMBODIMENT

The composition of the dry mix additive of the present invention preferably contains a pre-gelatinized, naturally occurring polymer such as corn starch in an amount of from 80–90 percent by weight, and an anti-settling agent such as a Xanthan type of biopolymer in an amount of from 10–20 percent by weight. The starch used to formulate the composition preferably comprises a mixture of two polysaccharide types amylose, a linear polymer and amylopectin, a highly branched polymer. The biopolymer, such as Xanthan gum, mixed with the starch, is surface treated with a dispersion agent, for example, glyoxal, to make the Xanthan gum easily dispersible in an aqueous medium, thereby minimizing lumps and fisheyes. Both the natural polymer and the synthetic polymer involved in the composition of the present invention are biodegradable. The dry mix additive of the present invention when mixed with an aqueous medium provides a water-based, clay-free and biodegradable drilling fluid for use in horizontal directional drilling (HDD), particularly useful in environmental horizontal well installation for soil and groundwater remediation, because it does not damage the formation surrounding the drilled borehole and does not block the flow path of the formation.

An amount of 29 to 46 pounds of the dry mix additive in accordance with the present invention is mixed directly with 100 U.S. gallons of fresh water to make a 12 to 15 pound of polymer mixture per 42 gallon barrel (Ob/bbl) drilling fluid with the desirable fluid rheological properties for HDD applications. Those desirable rheological properties include a ratio of yield point (YP) to plastic viscosity (PV), YP/PV, no less than 1.3 for better hole cleaning, a 10-minute gel strength of no less than 10 pounds per 100 square feet (lb/100 ft) for efficient cuttings suspension and transport, and an API (American Petroleum Institute) fluid loss of no greater than 15 milliliters (ml) per 30 minutes filtration time (ml/30 min) for minimizing drilled fluid loss to the host formation, particularly in an unconsolidated sandy soil. Plastic viscosity expressed in centipoises, yield point expressed in lb/100 ft$^2$, and gel strength expressed in lb/100 f are determined by the ANSI/API RP 13B-1: Standard Procedure for Field Testing Water-based Drilling Fluids, Section 2-viscosity and gel strength, using a 115-volt motor-driven viscometer such as a FANN 35-A V-G Meter. These three fluid Theological properties: YP/PV ratio ($\geq 1.3$), 10-minute gel strength ($\geq 10$), and API fluid loss ($\leq 15$) will serve three of the four criteria employed for the formulation optimization of the composition according to the present invention. The primary function of the starch in the composition of the present invention is to control fluid loss or filtration. Fully yielded and dispersed starch acts in the drilling fluid as a macromolecular colloid. The hydrated starch molecules attach to the surface of the borehole wall and bind the formation particles together, thus reducing permeability of the formation by plugging interstices with deformable gel particles. As the result of this coating mechanism, the deformable gel particles effectively prevent the drilling fluid from invading the host formation and aids in maintaining a stable open hole by reducing formation exposure to the drilling fluid. At the same time, this mechanism aids in maintaining a stable drilling fluid by minimizing loss of the aqueous phase to the formations penetrated with corresponding loss of dissolved components in the fluid. The coating mechanism of starch also contributes to successful drilling operation of the drilling fluid by minimizing solids dispersion through coating drilled cuttings as well as by promoting limited flocculation of drilled cuttings. A secondary function of the starch in this composition is in support of fluid rheological properties. As a macromolecular colloid, starch can have a noticeable effect in raising plastic viscosity values while providing minor increases in yield point values. In Example 1, the experiment Run 1 listed in Table 1 shows that if a 12 lb/bbl drilling fluid which consists of only starch such as IMPERMEX, marketed by Baroid Drilling Fluids, Inc. of Houston, Tex., in an amount of 100 percent by weight, the rheological properties of the fluid exhibit a low API filtrate of 19 ml/30 min but very low yield point and no gel strength. The drilling fluid containing only starch without addition of another polymer, such as the biopolymer used in the composition of the present invention, does not have those desirable fluid properties for drilling boreholes through subterranean formations.

A biopolymer (microbial extracellular polysaccharide) such as BARAZAN-D or BARAZAN-D PLUS, marketed by Baroid Drilling Fluids, Inc. of Houston, Tex., was incorporated in the composition of the dry mix additive of the present invention. The primary function of such a biopolymer, for example, a Xanthan type polymer, is to provide the drilling fluid with adequate gel strength for suspending cuttings while drilling. The secondary function of the biopolymer is to enhance the fluid rheological properties of the drilling fluid which consists of water and hydrated starch. The preferred biopolymer used in the composition, sometimes referred to as a modified XC polymer, is preferably treated with a dispersing agent, for example, glyoxal, for ease of dispersion in an aqueous medium. The XC polymer is used as a rheology modifier in that it increases the viscosity in the low shear rate flow regimes, such as in a wellbore annulus, much more than in the higher shear rate flows, such as in the drill pipe and through bit nozzles. This can result in better hole clearing while maintaining optimum bit hydraulics. A drilling fluid having the viscosity sufficient to prevent the drilled particles from separating from the drilling fluid when it is under the influence of only a low shear force is called a pseudoplastic fluid. The effect of the biopolymer in drilling fluid on horizontal well drilling is described in an article entitled "Biopolymer Fluids Eliminated Horizontal Well Problems," by M. Seheult, L. Grebe II, J. E. Traweck, Jr. and M. Dudly; published in World Oir, January, 1990. The XC polymer in the composition when mixed with water creates viscosity through a network of polymer-on-polymer chains. The hydrated XC polymer molecules with this highly branched network structure attribute to excellent cutting suspension characteristics. This superior suspension due to the macromolecular interaction with cuttings is crucial to keep the borehole open, especially in deviated, high angle sections of the borehole.

Guar gum, an edible carbohydrate polymer which is useful as a thickening agent, has been used in drilling fluids at several major horizontal well installation demonstrations by the Department of Energy with mixed results. In one instance, a guar gum-based drilling fluid was used to bore a directional hole to a vertical depth of 235 feet in a formation consisting of quarterary alluvial deposits which contained clay, silt, sand, and gravel. Installation of the well materials and tremie pipes went smoothly until the materials became stuck with 600 feet remaining. The material eventually broke. The failed installation indicated the borehole was not sufficiently cleaned and stabilized before well-material installation The failure was most likely because of the use of guar gum-based drilling fluid that did not have the gel strength and carrying capacity to remove enough sand and gravel from the deep borehole. The instance was documented in the article entitled "Environmental Horizontal Well Installation and Performance: Lessons Learned," in Horizontal News, Vol. 1, No. 2 published by Colorado Center for Environmental Management for the Department of Energy, Office of Technology Development. Unlike guar gum, biopolymers such as XC polymer have been used in water-based drilling fluids as additives to bore highly deviated angle holes successfully in loosely compacted formations. The XC polymer containing drilling fluids which exhibit pseudoplastic properties provides the drilling fluid with sufficient viscosity and gel strength for better hole cleaning and effective cuttings transport. A biopolymer like XC polymer, is in general, considered to be an expensive drilling fluid additive. A drilling fluid consisting of only 12 lb/bbl XC polymer such as Baroid's BARAZAN D-PLUS exhibits high rheological properties as the one (Run 10) shown Table 1, but it may not be economically feasible. Therefore, cost effectiveness of the composition was added as another evaluation criteria in the addition to those three defined previously. The composition of the dry mix additive of the present invention when mixed with an aqueous medium such as fresh water or acidic water at a concentration of 12 lb/bbl (pounds of dry polymer mix per 42 gallons of water) provides a water-based, clay-free, and biodegradable drilling fluid where the fluid rheological properties meet the three criteria, i.e. YP/PV ratio equal or greater than 1.3, 10-minute gel strength equal or greater than 10 lb/100 ft$^2$, and Standard API fluid loss equal or less than 15 ml/30 minutes; and the fourth criteria, i.e., estimated cost or economic factor equal to or less than $1.00 per pound. A "barrel" of drilling fluid, for purposes herein, is 42 U.S. gallons of liquid.

The dry mix additive of the present invention is prepared by conventional dry blending process. The order of addition is not critical; however, it is advisable to obtain a homogeneous admixture by blending the biopolymer into the natural polymer.

Based upon conventional wisdom, a biocide is often added to the drilling fluids which are subject to bacterial degradation under some environmental conditions. Microbial growth can result in a loss of viscosity and therefore fluid functionality. This is often the case for a drilling fluid consisting of natural polymers and/or biopolymers. Although the biopolymer used in the present invention is a complex branched heteropolysaccharide and is more resistant to bacterial attack than the natural polymer such as corn starch, the biopolymer is subject to bacterial degradation at a much slower rate. It has been found that with a small addition of commercially available liquid bleach containing 5.25% (household grade) or 12.5% (industrial grade) sodium hypochlorite, the drilling fluids containing the dry admixture of the present invention increase resistance to bacterial attack and still maintain the fluid properties for an extended period of time without adding any biocide which often causes some environmental concerns because of its toxicity.

It has also been found that a subsequent addition, i.e., after the drilling is completed, of dry granular calcium hypochlorite to the drilling fluids containing the dry admixture of the present invention, will chemically degrade the polymers in the drilling fluids within a few days and therefore a water solution of calcium hypochlorite is used as a developing fluid in developing the environmental horizontal well after the borehole was drilled with the drilling fluids containing the composition of the present invention.

The following examples are given to illustrate the invention but are not deemed to be limiting thereof. All percentages given are based upon weight unless otherwise indicated. All measurements were performed in accordance with American Petroleum Institutes Recommended Practice Standard Procedure for Field Testing Water-Based Drilling Fluids identified as API Recommended Practice 13B-1 (RP13B-1) First Edition, Jun. 1, 1990.

EXAMPLE 1 Runs 1 to 10

It is important to optimize the weight percent distribution of the two polymers in the composition of the present invention so that the dry mixture additive when added to fresh water will provide a water-based drilling fluid with maximum effectiveness. The optimization was conducted by the determination of the fluid rheological properties of a series of the polymer slurries each containing 12 lb/bbl of a dry mixture additive consisting of the two polymers (one natural, one biopolymer) with varying weight percent distribution. One polymer, thereafter designated as polymer 1, selected for optimization is a corn starch with the trade name of IMPERMEX which is marketed by Baroid Drilling Fluids, Inc. in Houston, Tex. Another polymer, hereafter designated as polymer 2, selected for optimization is a biopolymer with a trade name of BARAZAN D-PLUS, which is also marketed by Baroid Drilling Fluids, Inc in Houston, Tex. The total weight percent of the two polymers in each composition generally should be equal to 100% of the mixture. Table 1 (Runs 1 to 10) lists the fluid rheological properties of each polymer slurry for the optimization. Table 2 summarizes the optimization results and shows which polymer slurries with the rheological properties meet all three predetermined evaluation criteria-YP/PV ratio($\geq 1.3$), 10-minute gel strength ($\geq 10$ lb/100ft$^2$), and API fluid loss ($\leq 15$ ml/30 minutes), and with the economic value meet the forth criterion-cost ($\leq \$1.00$/lb). The results from the optimization concludes that the preferred weight percent range of the polymer 1 (IMPERMEX) should be from 80–90 percent by weight, and for the polymer 2 (BARAZAN D-PLUS) the weight percent range should be from 10–20 percent by weight.

TABLE 1

OPTIMIZATION OF TWO POLYMER COMPONENTS

| Run | 1 | 2 | 3 | 4 | 5 | 6 | 7 | 8 | 9 | 10 |
|---|---|---|---|---|---|---|---|---|---|---|
| Polymer 1, wt % | 100 | 95 | 92 | 90 | 88 | 85 | 82 | 80 | 50 | 0 |
| Polymer 2, wt % | 0 | 5 | 8 | 10 | 12 | 15 | 18 | 20 | 50 | 100 |
| Slurry preparation: To a barrel of fresh water, add 12 pounds of each blend product, and shear for 20 minutes using a Hamilton | | | | | | | | | | |
| Slurry, lb/bbl | 12 | 12 | 12 | 12 | 12 | 12 | 12 | 12 | 12 | 12 |
| Slurry rheological properties | | | | | | | | | | |
| 600 rpm | 16 | 31 | 42 | 49 | 56 | 66 | 76 | 78 | 119 | 273 |
| 300 rpm | 9 | 21 | 30 | 35 | 41 | 49 | 58 | 60 | 94 | 217 |
| Plastic viscosity, cP | 7 | 10 | 12 | 14 | 15 | 17 | 18 | 18 | 25 | 56 |
| Yield point, lb/100 ft$^2$ | 2 | 11 | 18 | 21 | 26 | 32 | 40 | 42 | 69 | 161 |
| 10 sec. gel | 0 | 3 | 7 | 9 | 12 | 16 | 20 | 21 | 25 | 77 |
| 10 min gel | 0 | 4 | 8 | 12 | 15 | 20 | 25 | 27 | 29 | 77 |
| YP/PV | 0.3 | 1.1 | 1.5 | 1.5 | 1.7 | 1.9 | 2.2 | 2.3 | 2.8 | 2.09 |
| Filtrate (API), ml/30 min | 19 | 11 | 11 | 12 | 12 | 15 | 14 | 12 | 17 | 9 |
| Cost, $/lb | 0.22 | 0.38 | 0.47 | 0.53 | 0.6 | 0.69 | 0.79 | 0.85 | 1.79 | 3.36 |

Polymer 1 such as Baroid's IMPERMEX
Polymer 2 such as Baroid's BARAZAN D-PLUS

TABLE 2

DETERMINATION OF THE PREFERRED COMPOSITIONS

| Run | 1 | 2 | 3 | 4 | 5 | 6 | 7 | 8 | 9 | 10 |
|---|---|---|---|---|---|---|---|---|---|---|
| Polymer 1, wt % | 100 | 95 | 92 | 90 | 88 | 85 | 82 | 80 | 50 | 0 |
| Polymer 2, wt % | 0 | 5 | 8 | 10 | 12 | 15 | 18 | 20 | 50 | 100 |
| Criteria | | | | | | | | | | |
| YP/PV ($\geq$1.3) | No | Yes | Yes | Yes | Yes | Yes | Yes | Yes | Yes | Yes |
| 10 min. gel ($\geq$10 lb/100 ft$^2$) | No | No | No | Yes | Yes | Yes | Yes | Yes | Yes | Yes |
| API Filtrate, ($\leq$15 ml/30 min) | No | Yes | Yes | Yes | Yes | Yes | Yes | Yes | No | No |
| Cost, ($\leq$$1.00/lb) | Yes | Yes | Yes | Yes | Yes | Yes | Yes | Yes | No | No |

EXAMPLE 2 Runs 11 to 13

It has been found that the dry mix additive of the present invention when added to acidic aqueous medium with solution pH below 7.0 provides a water-based, clay-free and biodegradable drilling fluid with the fluid rheological properties that meet the evaluation criteria. Table 3 (Runs 11 to 13) illustrates 12 pounds of dry mix per barrel with the preferred composition of the dry mixture was added to two aqueous solutions with solution pH adjusted to pH values of 4.1 (Run 12) and 2.2 (Run 11) with sulfuric acid. The fluid rheological properties of these two acidic slurries were compared to that of the slurry at the same concentration with solution pH of 8.6 (Run 13). Table 3 shows the fluid Theological properties even in an acidic environment such as pH of 2.2, still meet those predetermining evaluation criteria. The composition of the present invention is useful for use in horizontal directional drilling, particularly in an environment with acidic contaminants.

TABLE 3

EFFECT OF SOLUTION pH ON THE FLUID RHEOLOGICAL PROPERTIES OF THE SLURRIES CONSISTING OF 12 lb/bbl EACH OF THE DRY MIXTURE OF THE PRESENT INVENTION

| Run | 11 | 12 | 13 |
|---|---|---|---|
| Fresh water, bbl | 1 | 1 | 1 |
| Adjusted pH | 2.2 | 4.1 | 8.6 |
| Present Invention, lb/bbl | 12 | 12 | 12 |
| Rheological properties | | | |
| 600 rpm | 76 | 59 | 56 |
| 300 rpm | 55 | 42 | 41 |
| PV, cP | 21 | 17 | 15 |
| YP, lb/100 ft$^2$ | 34 | 25 | 26 |
| YP/PV | 1.6 | 1.5 | 1.7 |
| 10 min gel, lb/100 ft$^2$ | 13 | 15 | 15 |
| Filtrate (API), ml/30 min | 7 | 15 | 12 |

EXAMPLE 3 Runs 14 to 16

It has been found that the water-based, clay-free drilling fluid consisting of the dry mix additive of the present invention degradates biologically through microbial attack. It can also be destroyed chemically with the addition of calcium hypochlorite solution. The calcium hypochlorite used for the degradation study is a dry solid oxidant containing 65% available chlorine. Table 4 (Runs 14 to 16) shows the results of the addition of varying amounts of calcium hypochlorite to the aqueous slurries, each containing 8 pounds per barrel (Ob/bbl) of the dry mixture additive of the present invention. The calcium hypochlorite addition caused the slurry fluids' rheological properties to decrease with respect to time after mixing. The decrease in the fluids' Theological properties is due to the degradation of the polymers in the composition through an oxidation reaction.

TABLE 4

DEGRADATION OF THE COMPOSITION OF THE PRESENT INVENTION BY CALCIUM HYPOCHLORITE

| Run | 14 | 15 | 16 |
|---|---|---|---|
| Present invention, lb/bbl | 8 | 8 | 8 |
| Ca(OCl)$_2$, lb/bbl | 0 | 1.5 | 3.0 |
| Chlorine in solution, ppm | 0 | 500 | 1000 |
| 2-hours after mixing | | | |
| 600 rpm | 30 | 24 | 20 |
| 300 rpm | 20 | 17 | 14 |
| Apparent viscosity, cP | 15 | 12 | 10 |
| 24-hours after mixing | | | |
| 600 rpm | 30 | 18 | 14 |
| 300 rpm | 20 | 13 | 9 |
| Apparent viscosity, cP | 15 | 9 | 7 |
| 48-hours after mixing | | | |
| 600 rpm | 28 | 16 | 12 |
| 300 rpm | 20 | 13 | 9 |
| Apparent viscosity, cP | 14 | 8 | 6 |
| 96-hours after mixing | | | |
| 600 rpm | 20 | 14 | 10 |
| 300 rpm | 15 | 11 | 7 |
| Apparent viscosity, cP | 10 | 7 | 5 |

EXAMPLE 4

A water-based, clay-free drilling fluid containing the dry mixture additive of the present invention was tried under an actual field application in Clarke County, Ga. The project involved the drilling of an 859-foot directional well with a 600-foot horizontal section, and the installation of a 580-foot high density polyethylene well screen at a vertical depth of 67 feet. The horizontal well is to be used for in situ groundwater remediation of petroleum hydrocarbon. The area through which the hole was bored horizontally consisted of two types of formation: unconsolidated (soft) sand and gravel, and unweathered (hard) biotic gneiss rock. The slurry consisting of the composition of the present invention, viz., 80–90% starch and 10–20% Xanthan gum, was chosen as the preferred drilling fluid for use in this horizontal directional environmental well installation. Because the drilling fluid exhibits the following properties suitable for the application:high viscosity at low shear rates (psuedoplasticity) for solids transport under a variety of annular conditions, high gel strength profile for maximum cutting suspension, and low API filtration rate for minimum fluid loss particularly in unconsolidated sand and gravel. Another reason why the drilling fluid of the present invention was preferred is because that the drilling fluid is a clay-free slurry which does not form a wall cake that tends to obstruct the paths, and further preventing contaminants in the plume from being pumped out of the contaminated zone. A 9⅞ inch diameter pilot hole was drilled to a total measured depth of 254 feet at an 18.9° angle with a bentonite-based drilling fluid. The clay slurry (bentonite) was replaced with the clay-free, biodegradable drilling fluid of the present invention while building an angle at a total vertical depth of 67 feet. Approximately 70 barrels of the drilling fluid of the present invention at 12 to 15 lb/bbl were prepared at the surface. After 15 to 20 minutes of circulation, the bentonite slurry in the borehole was displaced with the drilling fluid of the present invention. The polymer slurry returning to the mud tank carried at least 30% total drilled solids. The remaining 600 feet of the horizontal section of the hole was drilled with the present invention polymer slurry at a maximum deviation of 92.4°. The drilling fluid has the fluid rheological properties as follows:

| Present invention, lb/bbl | 12 to 15 |
|---|---|
| Funnel viscosity, second/quart | 65 to 70 |
| Plastic viscosity, cP | 15 to 20 |
| Yield point, lb/100 ft$^2$ | 26 to 35 |
| 10-second gel, lb/100 ft$^2$ | 12 to 15 |
| 10-minute gel, lb/100 ft$^2$ | 15 to 20 |
| YP/PV ratio | 1.73 to 1.75 |
| API fluid loss, ml/30-minutes | 8.5 to 12 |

While drilling the horizontal section of the hole, the rate of penetration was reduced due to the formation change from unconsolidated soil to a biotite gneiss hard rock. The cuttings, coming out of a shaker equipped with two screens, 24 and 30 mesh respectively, appeared to be free from the drilling fluid. Unlike the cuttings attached with clay particles or sticky synthetic polymers, such as when the clay slurry or the high molecular weight synthetic polymer slurry is used as drilling fluid, the cuttings suspended in the drilling fluid of the present invention did not absorb much of the active polymers in the slurry. The cuttings appeared clean, as if they were rinsed with water or never exposed to the drilling fluid. The active polymers in the drilling fluid of the present invention provide the slurry with viscosity for the hole cleaning and adequate gel strength for cuttings transport, but they do not coat the surface of the cuttings as firmly as compared to a high molecular weight synthetic polymer. Drilling continued horizontally without difficulty and the maximum thrust pressure remained below 800 pounds per square inch (psi). The drilling operation was concluded after the 28th joint of the drill pipe was pushed. The true measured depth of the borehole was 862.2 feet with a horizontal section of 608 feet. After the pilot was completed as planned, the drillstring was tripped out of the hole and the horizontal well installation began. Horizontal well installation involved thirty 20-foot joints of 6 inch diameter slotted HDPE well screen in the horizontal section of the drilled borehole (608 feet) and another twelve 20-foot joints of the same diameter HDPE pipe in the inclined section of the drilled borehole (254 feet). No difficulty was encountered during the well installation. Well development was taking place immediately after completion of the horizontal well installation. The first pumping test was performed with the anticipation of a maximum flow rate of 30 gallons per minute. Surprisingly, an actual flow rate of 60 gallons per minute was obtained after 12 hours of pumping time. To ensure minimal amount of the residual polymers remaining in the borehole, a calcium hypochlorite aqueous solution was used as a medium to degrade the remaining polymers chemically, even though the active polymers in the composition of the present invention are known to be biodegradable. Another pumping test was performed after the calcium hypochlorite solution was circulated through the wellbore. The groundwater contaminated with gasoline was withdrawn and pumped out of the hole to a designated tank on the earth's surface for the remediation. The project was considered a success.

EXAMPLE 5

The drilling fluid of the present invention was used in yet another field trial application related to horizontal environmental wells installed in Hamilton, Miss. The project involved installation of five horizontal environmental wells with well screens of approximately 450 to 500 feet each to extract the brackish water which was leaking from a 20 to 30 acre holding pond into a swampy area below a dam. The true vertical depth of each well is about 30 feet below the dam. The drilling fluid of the present invention, viz., 80–90% natural starch and 10–20% Xanthan gum, was chosen as the drilling fluid to bore these five continuous wellbores because the drilling fluid of the present invention was used successfully in several previous applications similar to this one. The dry mix additive of the present invention provides a water-base, clay-free and biodegradable drilling fluid for drilling horizontal directional borehole efficiently and it does not block off the pore spaces of the host formation. After the drilling fluid of the present invention was mixed in a 150-barrel tank at 12 to 14 lb/bbl of the dry mix additive, a 8¾ inch pilot hole was drilled using Digit Track as the guidance system. On the entry and exit (370 feet) clay was drilled and the horizontal section consisted of coarse to medium sand. While drilling at 475 feet, measuring depth (MD) signals were lost and it was thought that the batteries in the probe were dead. The drilling pipe was pulled out and the batteries were changed in the probe. The bottom hole assembly (BHA) and the drill pipe were then tripped back in the hole without pumping. This indicated the hole drilled with the drilling fluid of the present invention stayed open in the unconsolidated sand. Drilling continued with punching out at 875-foot MD. The hole was reamed to 16½ inches with no problems. The 7 inch product line (SCHUMASOIL HDPE VHB-3) was pulled smoothly inside a 10 inch HDPE carrier pipe in 2½ hours. Fifty barrels of fresh water with 0.25 lb/bbl of calcium hypochlorite were pumped inside the line to destroy the polymer combination of the present invention. The 10 inch HDPE carrier pipe was then unbolted from the 7 inch product line and pulled out with a bulldozer in approximately 4 minutes. The contractor drilled this bore with an American Augers DD-70 equipped with a 150-barrel mixing tank with a scalping shale shaker, 2 cone desander over 120 mesh linear shaker, and 9 cone desilter over 120 mesh linear shaker. This provided excellent solids control. Approximately 30 cubic yards of sand was separated from the drilling fluid. The sand was extremely dry with no gummy residue. It apparently was free from the drilling fluid. About an hour after the 10 inch carrier pipe was pulled out of the hole, the well began to flow at 4 gallons per minute out of the screen riser at the entry side (screen riser was below water level in holding pond). According to the calculation by the on-site consultant, the hydraulic conductivity of the host formation did not change (decrease) after being exposed to the drilling fluid. Results indicated that the drilling fluid of the present invention does not alter the porosity or the permeability of the formation.

The invention may be embodied in other specific forms without departing from the spirit or essential characteristics thereof. The foregoing embodiments are therefore to be considered, in all respects, as illustrative and not restrictive, the scope of the invention being indicated by the appended claims rather than by the foregoing description, and all changes which come within the meaning and range of equivalence of the claims are therefore intended to be embraced therein.

What is claimed is:

1. A clay-free, inorganic salt-free, aqueous-based drilling fluid for use in drilling into and remediating environmentally contaminated earth formations comprising fresh water as the continuous phase of said drilling fluid and a dry mixture added to said fresh water, said dry mixture comprising a naturally occurring heteropolysaccharide comprising a pre-gelatinized corn starch and comprising from about 80–90 percent by weight of the mixture and a synthetic biopolymer comprising from about 10–20 percent by weight of the mixture, wherein said drilling fluid is biodegradable and has a ratio of yield point to plastic viscosity of 1.3 or greater, a 10 minute gel strength of 10 pounds per 100 square feet or more and a fluid loss of 15 milliliters per 30 minutes or less of filtration measured at 100 psi.

2. A clay-free, inorganic salt-free, aqueous-based drilling fluid for use in drilling into and remediating environmentally contaminated earth formations, comprising fresh water as the continuous phase of said drilling fluid and a dry mixture added to said fresh water, said dry mixture comprising a pre-gelatinized corn starch heteropolysaccharide comprising from about 80–90 percent by weight of the mixture and a synthetic biopolymer comprising Xanthan gum and comprising from about 10–20 percent by weight of the mixture, wherein said drilling fluid is biodegradable and has a ratio of yield point to plastic viscosity of 1.3 or greater, a 10 minute gel strength of 10 pounds per 100 square feet or more and a fluid of 15 millimeters per 30 minutes or less of filtration measured at 100 psi.

3. A clay-free, inorganic salt-free, aqueous-based drilling fluid for use in drilling into and remediating environmentally contaminated earth formations, comprising fresh water as the continuous phase of said drilling fluid and a dry mixture added to said fresh water, said dry mixture consisting of a naturally occurring heteropolysaccharide comprising from about 80–90 percent by weight of the mixture and a synthetic bipolymer comprising Xanthan gum and comprising from about 10–20 percent by weight of the mixture, wherein said Xantham gum has been treated with a dispersing agent comprising glyoxol, and said drilling fluid is biodegradable and has a ratio of yield point to plastic viscosity of 1.3 or greater, a 10 minute gel strength of 10 pounds per 100 square feet or more and a fluid loss of 15 millimeters over 30 minutes or less of filtration measured at 100 psi.

4. A dry mixture for use in an aqueous-based drilling fluid, comprising:

a natural heteropolysaccharide polymer comprising about 80–90 percent by weight of the mixture; and a synthetic biopolymer comprising from about 10–20 percent by weight of the mixture, wherein, when the mixture is added to an aqueous-based drilling fluid, the drilling fluid has a ratio of yield point to plastic viscosity of 1.3 or greater, a 10 minute gel strength of 10 pounds per 100 square feet or more and a fluid loss of 15 millimeters per 30 minutes or less of filtration measured at 100 psi and an effective amount of sodium hypochlorite to increase the resistance of the polymers in said drilling fluid to bacterial degradation.

* * * * *